April 7, 1959  J. B. DYER ET AL  2,880,621
WINDSHIELD WIPER ACTUATING MECHANISM
Filed April 6, 1953  3 Sheets-Sheet 1
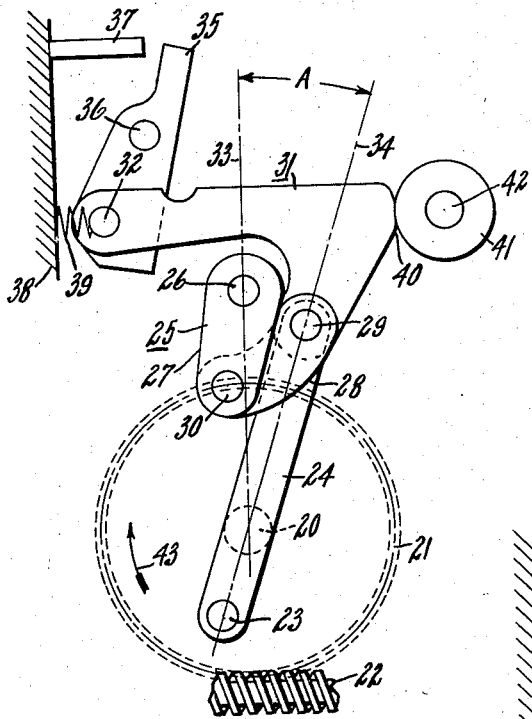
Fig. 1
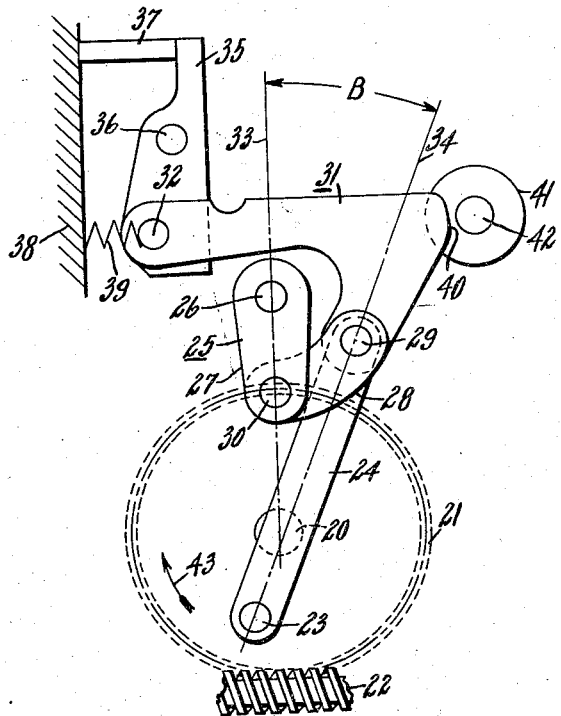
Fig. 2
Fig. 3
INVENTORS
JOHN B. DYER
WALTER D. HARRISON
BY George H. Strickland
THEIR ATTORNEY

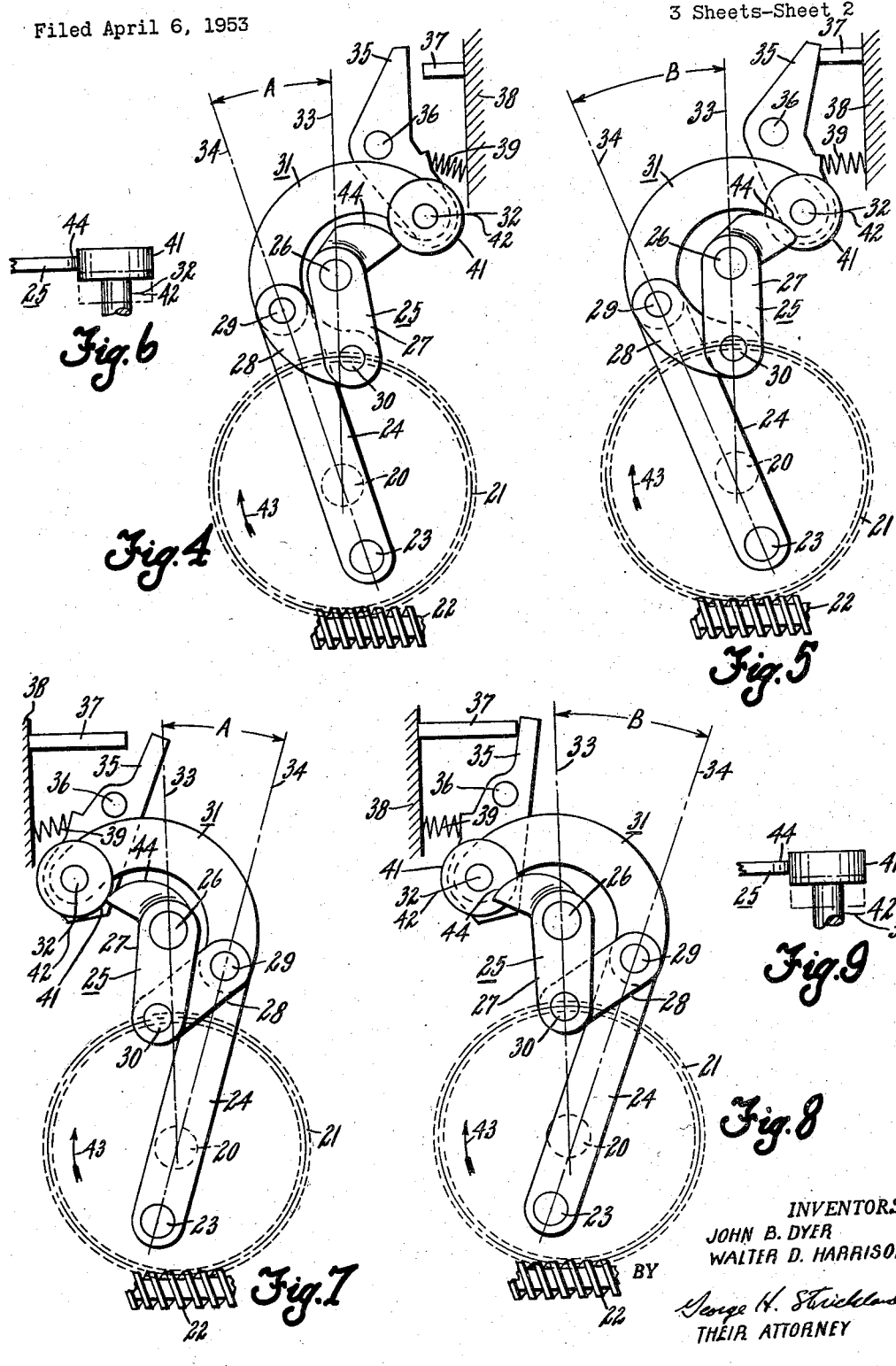

April 7, 1959 J. B. DYER ET AL 2,880,621
WINDSHIELD WIPER ACTUATING MECHANISM
Filed April 6, 1953 3 Sheets-Sheet 3
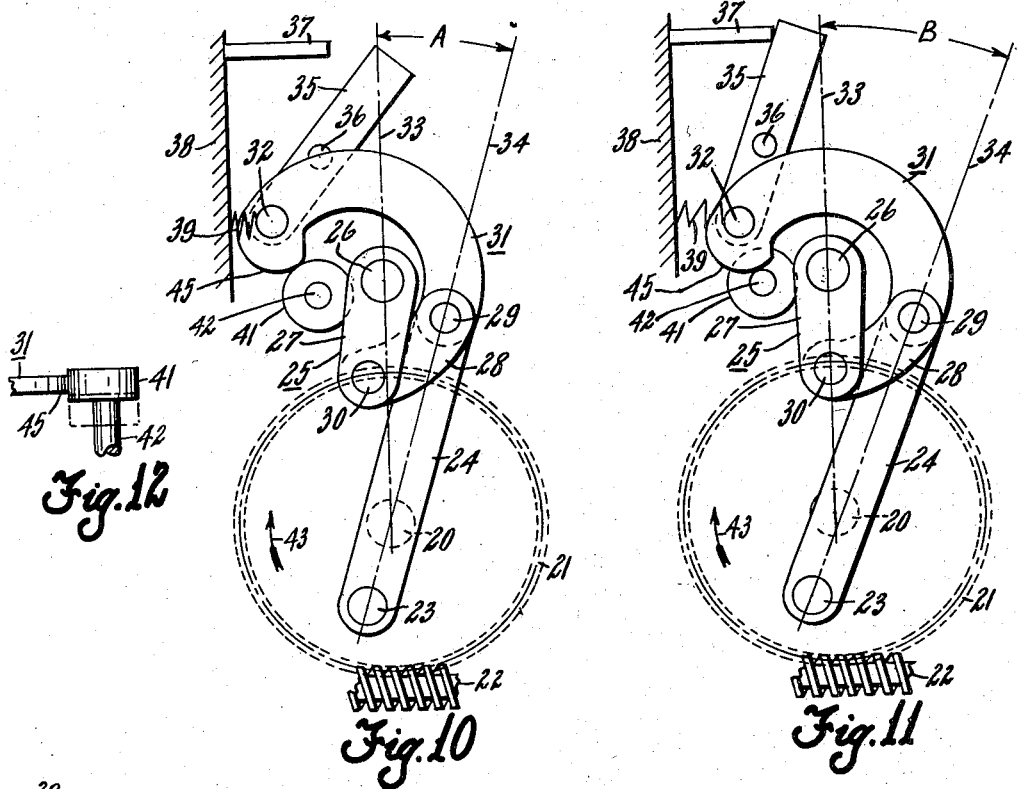
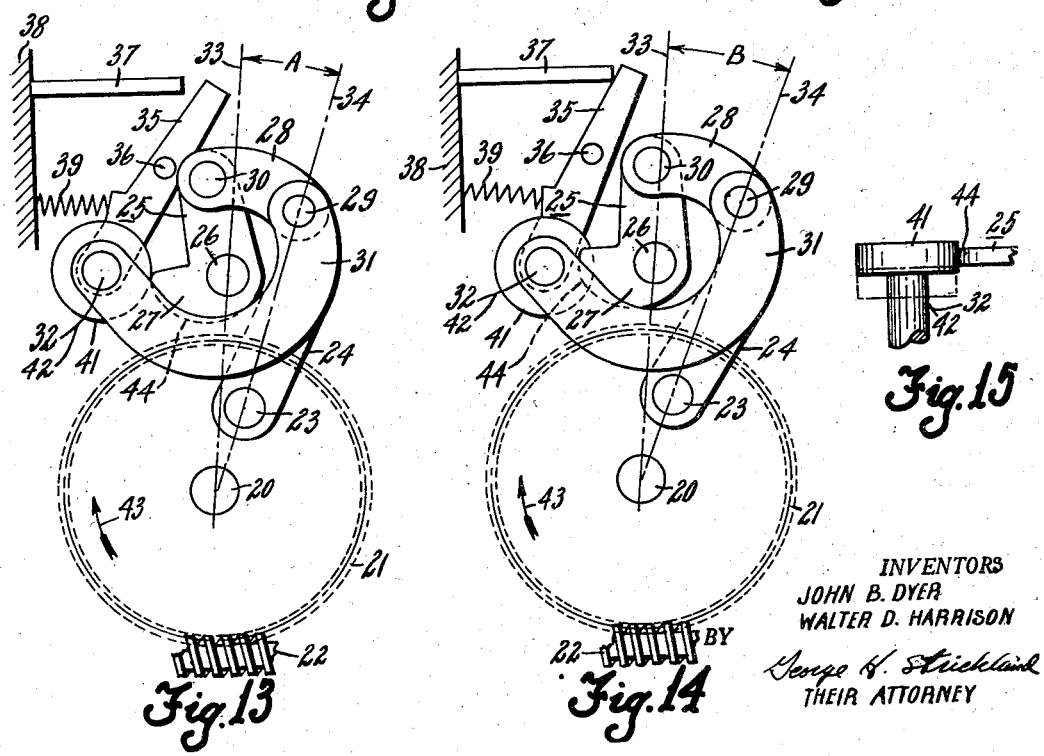
INVENTORS
JOHN B. DYER
WALTER D. HARRISON
BY George H. Strickland
THEIR ATTORNEY United States Patent Office 2,880,621
Patented Apr. 7, 1959

2,880,621

WINDSHIELD WIPER ACTUATING MECHANISM

John B. Dyer, Syracuse, and Walter D. Harrison, Rochester, N.Y., assignors to General Motors Corporation, Detroit, Mich., a corporation of Delaware Application April 6, 1953, Serial No. 347,022

18 Claims. (Cl. 74—75)

This invention relates to mechanical movements, and more particularly to a mechanical movement for converting rotary motion to oscillatory motion, with means to vary the amplitude of oscillatory motion.

There are numerous mechanical movements for converting rotary motion to oscillatory motion. Moreover, some mechanical movements of the aforesaid character also embody means to vary the amplitude of oscillatory motion. The present invention pertains to a mechanical movement including unique means for varying the amplitude of oscillation, that is capable of diverse application. Accordingly, among our objects are the provision of a mechanical movement including means for varying the amplitude of oscillation imparted to a member, and a further provision of such means which, while manually controlled, operate automatically to vary the amplitude of oscillatory movement imparted to a member.

The aforementioned and other objects are accomplished in this invention by providing a mechanical movement in which the effective operating length of a connecting rod may be varied. Specifically, the mechanical movement includes a compound linkage arrangement operatively connected to and driven by a connecting rod having one end pivotally connected by means of a crank pin to a unidirectional rotatable member. In this instance a rotatable member partakes the form of a worm gear that is driven by a worm by any suitable unidirectional rotary power means, such as an electric motor.

The compound linkage includes, a link pivotally interconnecting one end of the connecting rod and one end of a lever or arm extending from a member to be oscillated. A second link having a configuration similar to that of a bell crank, has one end pivotally connected at the point of pivotal connection between the first mentioned link and the connecting rod, the other end of the link having a movable pivot point connection for a reason which will appear hereinafter. The movable pivot connection of the second link is carried by a lever pivotally mounted to a fixed support. The lever is movable about its pivot point between predetermined limit positions. The movable pivot point of the bell crank shaped link, and, hence, the lever are normally spring biased to engage a stop.

The amplitude of oscillatory movement imparted to the driven member by rotation of the driving member may be varied by altering the angular relationship between the connecting rod and a line intersecting the axes of the driving and driven members. With the compound linkage arrangement disclosed, this variation in the angular position of the connecting rod may be said to vary the effective operating length of the connecting rod. In another sense, this adjustment may be said to vary the throw of the connecting rod, or, stated another way, by varying the angular position of the connecting rod, the extent of movement produced by the connecting rod, which is imparted to the driven member, may be varied.

In the disclosed embodiments, the force for displacing the movable pivot point of the bell crank shaped link, is derived from the rotating driving member. Thus, it may be said that the amplitude of oscillation is varied automatically by rotation of the driving member. However, manual control means are provided for selectively rendering the pivot point displacing means operative or inoperative. Thus, the operation may be rationalized by saying that the means for varying the oscillation imparted to the driven member, while manually controlled, operates automatically.

Further objects and advantages of the present invention will be apparent from the following description, reference being had to the accompanying drawings wherein preferred embodiments of the present invention are clearly shown, and wherein similar reference characters denote similar parts throughout the several views.

In the drawings:

Figs. 1 and 2 are views in elevation of the preferred form of mechanical movement constructed according to this invention, and depicting different effective operating lengths of the connecting rod.

Fig. 3 is a fragmentary view of the means for controlling the effective operating length of the connecting rod in Figs. 1 and 2.

Figs. 4 and 5 are views in elevation of another form of mechanical movement constructed according to this invention, and depicting different effective operating lengths of the connecting rod.

Fig. 6 is a fragmentary view of the means for controlling the effective operating length of the connecting rod in Figs. 4 and 5.

Figs. 7 and 8 are views in elevation of another form of mechanical movement constructed according to this invention, and depicting different effective operating lengths of the connecting rod.

Fig. 9 is a fragmentary view of the means for controlling the effective operating length of the connecting rod in Figs. 7 and 8.

Figs. 10 and 11 are views in elevation of another form of mechanical movement constructed according to this invention, and depicting different effective operating lengths of the connecting rod.

Fig. 12 is a fragmentary view of the means for controlling the effective operating length of the connecting rod in Figs. 10 and 11.

Figs. 13 and 14 are views in elevation of another form of mechanical movement constructed according to this invention, and depicting different effective operating lengths of the connecting rod.

Fig. 15 is a fragmentary view of the means for controlling the effective operating length of the connecting rod in Figs. 13 and 14.

At the offset it is to be understood that the means for transmitting rotary power to the driving member of the motion converting mechanism, does not form any part of the present invention, and reference to a specific rotary power means is not to be construed as a limitation. Moreover, while the mechanical movements herein disclosed are particularly adapted for actuating windshield wiper actuating mechanism of a motor vehicle, such as disclosed in copending application, Serial No. 347,021, now Patent No. 2,841,994, filed of even date herewith in the names of John B. Dyer and Walter D. Harrison, the movements are capable of actuating other mechanisms, such as will be readily apparent to those skilled in the art.

With particular reference to Figs. 1 through 3, the preferred embodiment of the present invention will be described. Rotatably supported by means of a shaft 20, is a worm gear or wheel 21 having operative engagement with a worm 22, which may be operatively connected to and driven by any suitable rotary power means, not shown. The worm gear 21 carries a bearing 23 constituting a crank pin, the bearing 23 being eccentrically disposed with respect to the rotative axis of the gear. A connecting rod, or pitman arm, 24 has one end thereof pivotally connected with the crank pin 23, in consequence of which the connecting rod will be continuously operated upon rotation of the worm gear. The other end of the connecting rod 24 extends adjacent to the driven member 25, which is to be oscillated.

The driven member 25 comprises a rotatably supported shaft 26 having attached thereto an arm, or lever, 27, which extends substantially radially therefrom. The ends of the lever 27 and the connecting rod 24 are interconnected by an operating link 28, which, as shown in Figs. 1 and 2, is of arcuate configuration. The link 28 has pivotal connection with the connecting rod at 29, and pivotal connection with the lever 27 at 30. The mechanical movement thus far described constitutes a compound linkage arrangement for converting rotary motion of the worm gear 21 into fixed magnitude oscillatory motion of the driven, or actuating shaft, 26. Thus, if the gear 21 is rotated by the worm 22, the driven member 25 will be moved in an oscillatory arc of predetermined magnitude.

In order to increase the amplitude of oscillatory movement transmitted to the driven member 25 by the compound linkage previously described, means are provided for increasing the effective operating length of the connecting rod 24. These means include, in Figs. 1 and 2, a bell crank shaped link 31, one end of which is pivotally connected at 29, which is the point of pivotal connection between the link 28 and the connecting rod 24. The other end of the link 31 is carried by a pivot 32, which may be displaced to increase the effective operating length of the connecting rod 24 by altering the angular relationship between the connecting rod and a line intersecting the axes of the driving and driven members, 21 and 25. Thus, it may be said that the link 31 has a movable pivot point connection at one end thereof.

In Figs. 1 and 2 numeral 33 indicates a line intersecting the axes of shaft 26 and shaft 20, while numeral 34 indicates a line intersecting the pivot point connections of opposite ends of the connecting rod 24. Fig. 1 illustrates the movable pivot point 32 in one position, while Fig. 2 illustrates the same pivot point in another position. From a comparison of Figs. 1 and 2, it is readily apparent that the angle A, included between lines 33 and 34 in Fig. 1, is less than the angle B, included between the lines 33 and 34 in Fig. 2. Thus, it is said that by displacing the pivot point 32, the angular relationship between the connecting rod and a line intersecting the axes of the driving and driven members, is altered. By changing the included angle between lines 33 and 34 in Figs. 1 and 2, the throw of the connecting rod 24 may be varied, or stated in other words, by varying the angle between lines 33 and 34, the extent of oscillatory movement imparted to the driven member 25 which is produced by the connecting rod 24, may be varied.

The pivot 32 is carried by a lever 35, that is pivotally connected intermediate its ends at 36 to fixed supporting structure, not shown. The lever 35 is permitted to swing about its pivot point 36 within predetermined limit positions. One end of the lever 35 cooperates with, and is formed to abut a stop 37 carried by fixed supporting structure 38 to thereby limit counterclockwise movement of the lever 35 about its pivot point, as viewed in Figs. 1 and 2. The lever 35 is normally biased into engagement with the stop 37 by means of a coil spring 39, one end of which is suitably attached to the supporting structure 38, and the other end of which acts on pivot 32. Clockwise movement of the lever 35 about its pivot point it limited by the degree of compression permitted by spring 39.

As alluded to hereinbefore, the means for displacing the movable pivot point 32 so as to vary the effective operating length of the connecting rod 24, is automatically operable, although manually controlled. By automatically operable, we mean that the pivot point 32 may be displaced either by rotation of the worm gear 21, or by the spring 39, depending upon the direction of movement of the pivot point 32. In Figs. 1 and 2, the bell crank shaped link 31 is formed with a cam surface 40, which is adapted to cooperate with an axially movable roller 41 supported by a shaft 42 carried by suitably fixed supporting structure, not shown.

With particular reference to Fig. 3, the axial position of the roller 41 in which it is adapted to contact the cam surface 40 of the link 31 is shown in full lines, while the inoperative position thereof is shown in dotted lines. Any suitable manually actuated means may be employed to effect axial movement of the roller 41, for example, a Bowden wire, as disclosed in the aforementioned copending application. Suffice it here to say that during normal operation of the mechanical movement, the roller 41 is moved out of alignment with respect to the link 31 and to the dotted line position shown in Fig. 3, such that rotation of the driving member 21 will effect oscillation of the driven member 25 throughout a fixed arc. In the disclosed embodiments axial movement of the roller into alignment with the link 31 so that upon movement of the link 31, the cam surface 40 will be moved into engagement therewith, displaces the pivot point 32 so as to increase the amplitude of the oscillatory movement of the driven member 25. However, it is to be understood that variation of the oscillatory arc to a lesser angle may also be effected by reversing the direction of movement of the pivot point 32, this type of adjustment being within the scope of the present invention.

The operation of the mechanism disclosed in Figs. 1 through 3 is as follows. At the offset, it will be presupposed that the roller 41 has been moved to its dotted line position of Fig. 3, such that upon swinging movement of the link 31 about its pivot point 32 caused by rotation of the gear 21 in the direction of arrow 43 in Figs. 1 and 2, the cam surface 40 will not physically engage the roller 41. In this instance rotation of the worm gear 21 will effect oscillation of the driven member 25 throughout a predetermined angle, the amplitude of which is determined by the relative proportions of the elements constituting the compound linkage. With the arrangement disclosed in Figs. 1 and 2, the oscillating motion of the driven member 25 with the roller 41 in the dotted line position in Fig. 3 is substantially 120°. If the operator now desires to increase this amplitude of oscillation, he need only manually move the roller 41 to the position shown in Fig. 3.

With the roller in the full line position of Fig. 3, the cam surface 40 of the link 31 will move into physical engagement with the roller during swinging movement of the link 31 so as to move the pivot point 32 from the position shown in Fig. 2 to the position shown in Fig. 1. By displacing the pivot point 32 to the position of Fig. 1, the angle between lines 33 and 34 is altered in this instance, the included angle A being less than the included angle B. By decreasing the included angle between lines 33 and 34, the effective operating length of the connecting rod 24, or the throw thereof, is increased, and, consequently, the amplitude of oscillatory movement transmitted by the linkage assembly to the driven member 25 is increased. In the arrangement shown in Figs. 1 to 3, the increase in the amplitude of oscillatory movement is substantially 15°. Thus, the arc of oscillation of the driven member 25 is now substantially 135°. If the operator desires to reduce this oscillatory arc to 120°, he need only move the roller 41 to its dotted line position of Fig. 3, and the spring 39 will automatically move the pivot point 32 from the position of Fig. 1 to the position of Fig. 2, to obtain the desired result.

With particular reference to Figs. 4, 5 and 6, a modified form of mechanical movement, similar to the embodiment of Figs. 1 through 3, is shown, like parts being represented by like numerals. In this instance the link 31 is of arcuate configuration and the driven member 25 is formed with a cam surface 44 adapted to engage the surface of roller 41. The roller 41 is again manually movable between the full and dotted line positions of Fig. 6. When the roller 41 is in the dotted line position of Fig. 6, the cam surface 44 does not come into contact therewith and, accordingly, the amplitude of oscillation of the driven member 25 is of a predetermined magnitude. To increase the amplitude of oscillation of the driven member 25, the operator need only move the roller 41 to the full line position shown in Fig. 6, wherein during oscillatory movement of the driven member 25, the cam surface 44 will contact the roller 41 and displace the movable pivot point 32 of the link, which, in this instance, also forms the supporting shaft 42 for the roller 41. In this manner the included angle between lines 33 and 34 may be varied to thereby vary the effective operating length of the connecting rod 24.

With particular reference to Figs. 7 through 9, an arrangement similar to that disclosed in Figs. 4 through 6 is shown, the difference residing in the fact that the link 28 is of straight configuration rather than the arcuate configuration of Figs. 4 and 5. The mechanism of Figs. 7 through 9 operates in a manner identical with that discussed with regard to Figs. 4 through 6.

With reference to Figs. 10 through 12, still another modification of the mechanical movement is illustrated. In this instance link 31 is formed with a cam surface 45 adjacent the movable pivot point connection 32 thereof. The cam surface 45 is again adapted for engagement with the roller 41 in the full line position of Fig. 12. When the roller 41 is moved to this position, swinging movement of the link 31 will displace the pivot point 32 from the position of Fig. 11 to the position of Fig. 10 due to engagement between cam surface 45 and roller 41. Displacement of the pivot point 32 from the position of Fig. 11 to the position of Fig. 10 will again increase the amplitude of oscillatory movement transmitted to the driven member 25, by altering the angular relationship between lines 33 and 34.

A still further modification somewhat similar to that depicted in Figs. 4 through 9, is shown in Figs. 13 through 15. The similarity resides in the fact that the driven member 25 is again formed with a cam surface 44 adapted for engagement with the roller 41, the shaft 42 of the roller 41 again coinciding with the movable pivot point 32 of the adjusting link 31. The structural difference resides in the fact that the connecting rod 24 in Figs. 13 and 14 has a straight portion and a curved portion. This type of connecting rod may be desirable under certain circumstances where a compact mechanical movement mechanism is required. The movement operates in a manner similar to that discussed with respect to Figs. 4 and 5 in that if the roller 41 is moved to its full line position of Fig. 15, swinging movement of the driven member 25 will displace the pivot point 32 of the link 31 so as to increase the amplitude of oscillatory movement to the member 25.

While the embodiments of the present invention as herein disclosed, constitute preferred forms, it is to be understood that other forms might be adopted.

What is claimed is as follows:

1. In apparatus of the character described, a rotatable driving member, an element mounted to be alternately oscillated, a movable operating member connected at one end to oscillate said element, an adjusting link movably connected at the other end of said operating member, means connected to said driving member for applying swinging force to said member and link substantially at the point of movable connection therebetween, a movable pivot connection for the free end of the adjusting link, and manually positionable means constructed and arranged to engage said adjusting link during its swinging movement so as to displace said movable pivot connection due to swinging movement of said adjusting link to vary the amplitude of oscillation imparted to said element.

2. Means for operating a member including an oscillatable actuating shaft having an arm extending therefrom, comprising in combination a rotatable driving member, an operating member swingably connected with said arm and having a bearing at its free end, an adjusting element swingably connected to said bearing, means connected to said driving member for applying operating force to said operating member and adjusting element, a movable pivot connection for the remaining end of said adjusting element, and manually positionable means constructed and arranged to engage the adjusting element during its movement so as to displace said movable pivot connection due to movement of said adjusting element to vary the amplitude of oscillation imparted to said shaft.

3. In a mechanical movement of the character described, a rotatable driving member, an oscillatable driven member, means interconnecting said members constructed and arranged so as to impart oscillatory movement of fixed magnitude of said driven member upon rotation of said driving member, and means operatively associated with and actuated due to movement of said first recited means for varying the amplitude of oscillatory movement of said driven member.

4. In a mechanical movement of the character described, a rotatable driving member, an oscillatable driven member, means operatively interconnecting said members constructed and arranged to impart oscillation to said driven member upon rotation of said driving member, said means including a connecting rod, and means operatively associated with and actuated due to movement of said first recited means for varying the effective operating length of said connecting rod so as to vary the amplitude of oscillation of said driven member.

5. In a mechanical movement of the character described, a rotatable driving member, an oscillatable driven member, means operatively interconnecting said member constructed and arranged to impart oscillation to said driven member upon rotation of said driving member including a connecting rod and an adjusting link having operative interconnection, a movable pivot point for said adjusting link, and manually positionable means adapted to operatively engage said adjusting link during movement thereof to displace said pivot point due to movement of said adjusting link whereby the effective operating length of the connecting rod is altered so as so as to vary the amplitude of oscillatory movement transmitted to said driven member.

6. The combination set forth in claim 5 wherein said driving member has imparted thereto unidirectional rotation, and wherein said connecting rod has pivotal connection with said driving member at a point displaced from the axis of rotation thereof.

7. The combination set forth in claim 5 wherein the means interconnecting the driving and driven members includes an arm extending from said driven member and an element having pivotal connection with said arm at one of its ends and having pivotal connection with said adjusting link at its other end.

8. The combination set forth in claim 5 wherein the means for displacing the movable pivot point of said adjusting link comprises a manually movable element, and wherein said adjusting link has formed thereon a cam surface constructed and arranged to cooperate with said movable element and thereby displace said movable pivot point due to movement of said adjusting link by said connecting rod when the element is moved to a position so as to engage said adjusting link.

9. The combination set forth in claim 5 wherein the movable pivot point for said adjusting link is carried by a spring biased element which normally maintains the movable pivot point a predetermined position.

10. In a mechanical movement, a rotatable driving member, an oscillatable driven member, means interconnecting said members constructed and arranged so as to impart oscillatory movement to said driven member upon rotation of said driving member, said means including a connecting rod having pivotal connection with said driving member, and means operatively associated with and actuated due to movement of said connecting rod to vary the angular relationship between the connecting rod and a line intersecting the axes of the driving and driven members so as to vary the magnitude of oscillation imparted to said driven member.

11. Means for operating a member including an oscillatable actuating shaft having an arm extending therefrom, comprising in combination an operating member swingably connected with said arm and having a bearing at its free end, an adjusting element swingably connected to said bearing, means applying operating force to said operating member and adjusting element, a variable movable pivot point connection for the remaining end of said adjusting element, and manually positionable means constructed and arranged to engage said actuating shaft arm during its movement so as to displace said movable pivot connection due to movement of said arm.

12. In apparatus of the character described, an element mounted to be alternately oscillated, movable operating member connected at one end to oscillate said element, an adjusting element movably connected at the other end of said operating member, means applying swinging force to said member and element substantially at the point of movable connection therebetween, a movable pivot point connection for the free end of the adjusting element, and manually positionable means constructed and arranged to engage said oscillatable driven element during its oscillating movement so as to displace said movable pivot point connection due to movement of said oscillatable driven element to vary the amplitude of oscillation imparted thereto.

13. In a mechanical movement of the character described, a rotatable driving member, an oscillatable driven member, means operatively interconnecting said members constructed and arranged to impart oscillation to said driven member upon rotation of said driving member including a connecting rod and an adjusting link having operative interconnection, a movable pivot point for said adjusting link, and manually positionable means adapted to operatively engage said oscillatable driven member during movement thereof to displace said pivot point due to movement of said oscillatable member whereby the effective throw of the connecting rod is altered so as to vary the amplitude of oscillatory movement transmitted to said driven member.

14. The combination set forth in claim 13 wherein said driving member has imparted thereto unidirectional rotation, and wherein said connecting rod has pivotal connection with said driving member at a point displaced from the axis of rotation thereof.

15. The combination set forth in claim 13 wherein the means interconnecting said driving and driven members includes an arm extending from said driven member and an element having pivotal connection with said arm at one of its ends and having pivotal connection with said adjusting link at its other end.

16. The combination set forth in claim 13 wherein the means for displacing the movable pivot point of said adjusting link comprises a manually movable element, and wherein said oscillatable member has formed thereon a cam surface constructed and arranged to cooperate with said movable element and thereby displace the movable pivot point due to movement of said oscillatable member when the element is moved to a position so as to engage said cam surface.

17. The combination set forth in claim 13 wherein the connecting rod is formed with straight and curved portions.

18. In a mechanical movement of the character described, a rotatable driving member, an oscillatable driven member, means operatively interconnecting said members constructed and arranged to impart oscillation to said driven member upon rotation of said driving member including a connecting rod and an adjusting link having operative interconnection, a movable pivot point for said adjusting link, a spring-biased element carrying said movable pivot point for normally maintaining the movable pivot point at a predetermined position, and manually positionable means adapted to operatively engage said oscillatable driven member during movement thereof to displace said pivot point due to movement of said oscillatable member whereby the effective throw of the connecting rod is altered so as to vary the amplitude of oscillatory movement imparted to said driven member.

References Cited in the file of this patent

UNITED STATES PATENTS

| | | |
|---|---|---|
| 2,162,124 | Robin | June 13, 1939 |
| 2,173,447 | Horton | Sept. 19, 1939 |
| 2,403,233 | Patch | July 2, 1946 |
| 2,654,259 | Tisdale | Oct. 6, 1953 |
| 2,768,530 | Brundage | Oct. 30, 1956 |
| 2,825,019 | Harrison | Feb. 25, 1958 |

FOREIGN PATENTS

| | | |
|---|---|---|
| 27,731 | Great Britain | Dec. 19, 1904 |